Patented Aug. 3, 1948

2,446,238

UNITED STATES PATENT OFFICE 2,446,238

SELENIUM RECTIFIER PLATE

George F. Mueller, Highland Park, Ill., assignor to Fansteel Metallurgical Corporation, North Chicago, Ill., a corporation of New York No Drawing. Application November 11, 1944, Serial No. 563,110

9 Claims. (Cl. 175—366)

This invention relates to blocking layer devices such as selenium rectifiers and light sensitive devices, and more specifically to means for forming an artificial blocking layer on the selenium.

In the production of blocking layer devices having a semi-conductor layer, for example, selenium rectifiers, a rigid carrier electrode or supporting electrode is provided with a thin coating or layer of selenium. The supporting electrode may be formed of nickel, nickel-plated iron, aluminum, magnesium, beryllium or other metals and alloys. A common practice in the production of selenium rectifiers includes grit blasting the iron disc or plate and electroplating the disc with nickel. The purpose of the grit blasting is to present a roughened surface to the selenium and to thereby improve the adherence of the selenium to the carrier electrode. The disc is then thoroughly cleaned and a thin film of selenium is applied over the nickel layer.

The selenium film or layer may be formed by a variety of methods. The plate or disc may be heated to a temperature above the melting point of selenium, for example, to a temperature of from 230° to 250° C., and the selenium in stick form may be rubbed across the heated plate in order to melt the selenium and form the desired film. Another method of application includes placing a measured quantity of powdered selenium or selenium in pellet form on the heated plate and flowing the melted selenium over the surface. The melted selenium is usually spread over the heated plate by mechanical means, as with a glass rod. The selenium may also be deposited on the carrier electrode from a vapor phase. The vaporization method is commonly employed in depositing the selenium film upon the light metal carrier electrodes. Various materials may be added to the selenium to increase its conductivity and otherwise impart desired characteristics and properties.

The selenium is then transformed into its gray, crystalline state by heat treatment. The coated discs are generally stacked with mica, aluminum or other inert, smooth-surfaced discs or washers in contact with the selenium and between adjacent plates, and the stack subjected to a moderate pressure. The stacks under pressure are then subjected to a relatively low temperature, that is, a temperature below 150° C., and maintained at such temperature for from one hour to four or five hours. During this stage of the heat treatment the selenium softens so that the pressure produces a layer of selenium of relatively uniform thickness and having a smooth surface.

The stacks are withdrawn from the oven or heat treating furnace and the plates are removed from the stack. The plates are then given a further heat treatment at a temperature approaching the melting point of selenium. This heat treatment is generally conducted at temperatures between about 200° C. and the melting point of selenium, for example, about 210° C., for a period of from fifteen minutes to several hours. During the combined heat treatment, a layer of selenium is produced having a smooth surface of more or less uniform thickness and the selenium is transformed from its amorphous, non-conducting form into its gray, crystalline, conducting form.

The smooth surface of the selenium film is then treated to form an artificial blocking layer and a counter-electrode consisting of a relatively low melting point alloy is applied, as by spraying, over the selenium coating.

The final step in the manufacture of the rectifier plates consists of an electrical forming treatment. This treatment consists of subjecting the plate to either an alternating or direct current until a high resistance is developed in the reverse direction. This step may consist of applying to the plate in the reverse direction a direct current voltage below about 15 volts or a pulsating direct current voltage starting with a low voltage of about 8 volts and gradually increasing the voltage to about 21 volts over a period of several hours.

In the use of an alternating current, it is necessary to include in the circuit a current limiting resistor because one-half cycle flows in the forward direction of the rectifier plate. The voltage may be about 20 volts and the period required for forming is generally greater than that required when a direct current is employed because only one-half cycle of the current flows in the reverse direction.

Light sensitive devices of the blocking layer class are produced in a similar manner. A supporting electrode is provided with a thin film or layer of selenium in its gray, crystalline modification and an artificial blocking layer formed on the surface of the selenium. A second electrode is then applied over the treated surface of the selenium. This electrode may consist of a light-permeable film of metal or a metal grid. The application of the light-permeable metal may be accomplished by any of the methods known to the art.

This invention is directed to a method of forming an artificial blocking layer on the film of selenium in the manufacture of blocking layer devices. This method is not limited to any specific form, type or composition of carrier electrode or counter-electrode. Any desired method may be employed in providing the carrier electrode with the film or layer of gray, crystalline, conducting selenium. The selenium layer may or may not contain added materials to impart desired characteristics and properties.

The principal object of this invention is to provide a method of forming an artificial blocking layer on the surface of the selenium layer.

Other objects and advantages of this invention will become apparent from the following description and claims.

The present invention contemplates subjecting the surface of the selenium layer in its gray, crystalline modification to the action of benzophenone vapors.

The specific details of the manufacturing process of the element are dependent upon the type of unit being made and the class of service for which it is designed. For purposes of illustration, the production of selenium rectifier plates is described.

A carrier electrode consisting of a grit blasted, nickel-plated iron disc is provided with a layer or film of selenium in its gray, crystalline form by any of the aforementioned methods. The selenium may contain added materials to improve the conductivity, as is well known to the art. The selenium surface is then exposed to the hot vapors produced by heating benzophenone to its boiling point which is about 306° C. The period of exposure of the selenium surface to the hot vapors may vary from a few seconds to several minutes, and I prefer to expose the surface to the vapors for from about 5 seconds to about 15 or 20 seconds.

The benzophenone may be placed in an open container and heated to its boiling point. The plates are exposed individually to the vapors by manually or mechanically passing each plate over the open top of the container through the rising vapors. The plates may be placed upon an endless conveyor belt which passes through a chamber having an atmosphere of the vapors.

The counter-electrode is subsequently applied as by spraying a low melting point alloy over the treated selenium surface. The rectifier plate is finally subjected to any of the desired electrical forming processes known to the art.

One of the methods commonly employed in grading selenium rectifier plates includes measuring the current flow in the reverse or blocking direction upon the application of a direct current voltage to the plate in the blocking direction. For an ideal or theoretically perfect rectifier plate no current would flow in the reverse direction under such conditions. Rectifier plates having area of about 12 sq. cm. and made without the blocking layer treatment of this invention pass a current of the order of 50 milliampers upon the application of a direct current voltage of 20 volts in the reverse direction. Rectifier plates made in accordance with the present invention from the same sample of selenium will pass a current of the order of 10 to 20 milliamperes upon the application of a direct current voltage of 20 volts in the reverse direction.

A further method employed in evaluating the quality of selenium rectifier plates is a determination of the rectification ratio at 1 volt and at 3 volts. This ratio is the ratio between the current flow in the reverse direction and the current flow in the forward direction upon the application of a direct current voltage in the reverse and forward directions. For a theoretically perfect rectifier plate, this ratio is 0. Rectifier plates having an area of about 12 sq. cm. made in accordance with the present invention have a rectification ratio at these voltages of the order of ¼ to ½ the rectification ratio of rectifier plates made from the same sample of selenium without the blocking layer treatment of this invention.

These improvements are representative of the advantages of my invention and the specific numerical values are representative of these improvements when a normal grade of selenium is employed in the production of the rectifier plates. It is obvious that the numerical values of reverse and forward current flow and rectification ratios will differ with different applied voltages, with different size rectifier plates, with various substances which might be added to the selenium to alter its characteristics and with different samples and grades of selenium.

I claim:

1. The method of producing blocking layer devices which comprises providing a supporting electrode with a layer of gray, crystalline selenium, subjecting the surface of the selenium layer for from about five seconds to about twenty seconds to the action of vapors formed by heating benzo-phenone to its boiling point and applying a counter-electrode over the treated selenium surface.

2. The method of producing blocking layer devices which comprises applying a layer of selenium to a supporting electrode, transforming the selenium into its gray, crystalline form, exposing the surface of the selenium layer for from about five seconds to about twenty seconds to the vapors formed by heating benzophenone to its boiling point and applying a counter-electrode over the treated selenium surface.

3. The method of producing selenium rectifier plates which comprises providing a supporting electrode with a layer of gray crystalline selenium, subjecting the surface of the selenium layer for from about five seconds to about twenty seconds to the action of vapors formed by heating benzophenone to its boiling point, applying a counter-electrode over the treated selenium surface and subjecting the composite unit to an electrical forming operation.

4. The method of producing selenium rectifier plates which comprises applying a layer of selenium to a supporting electrode, transforming the selenium into its gray, crystalline form, passing the coated plate through the vapors formed by heating benzophenone to its boiling point, whereby the selenium surface is exposed to the vapors for from about five seconds to about twenty seconds, applying a counter-electrode over the treated selenium surface and subjecting the composite unit to an electrical forming operation.

5. In a method of producing blocking layer devices including a selenium layer, the step which comprises exposing the surface of the selenium layer for from about five seconds to about twenty seconds to vapors formed by heating benzophenone to its boiling point.

6. In a method of producing selenium rectifier plates, the step which comprises subjecting the selenium surface for from about five seconds to about fifteen seconds to the action of vapors formed by heating benzophenone to its boiling point.

7. The method of forming an artificial blocking layer on the surface of the selenium layer in a selenium rectifier plate which comprises subjecting the surface of the selenium for from about five seconds to about fifteen seconds to the action of vapors formed by heating benzophenone to its boiling point.

8. A blocking layer device comprising a supporting electrode, a layer of selenium on the electrode, the surface of the selenium being treated with vapors formed by heating benzophenone to its boiling point and a counter-electrode on the treated selenium surface.

9. A selenium rectifier plate comprising a supporting electrode, a layer of selenium on the electrode, the surface of the selenium being treated with vapors formed by heating benzophenone to its boiling point and a counter-electrode over the treated selenium surface.

GEORGE F. MUELLER.

REFERENCES CITED

The following references are of record in the file of this patent:

UNITED STATES PATENTS

| Number | Name | Date |
| --- | --- | --- |
| 2,121,603 | Lotz | June 21, 1938 |
| 2,193,598 | Lotz | Mar. 12, 1940 |
| 2,361,969 | Saslaw | Nov. 7, 1944 |
| 2,362,545 | Ellis et al. | Nov. 14, 1944 |
| 2,375,355 | Lindblad | May 8, 1945 |